Patented July 8, 1924.

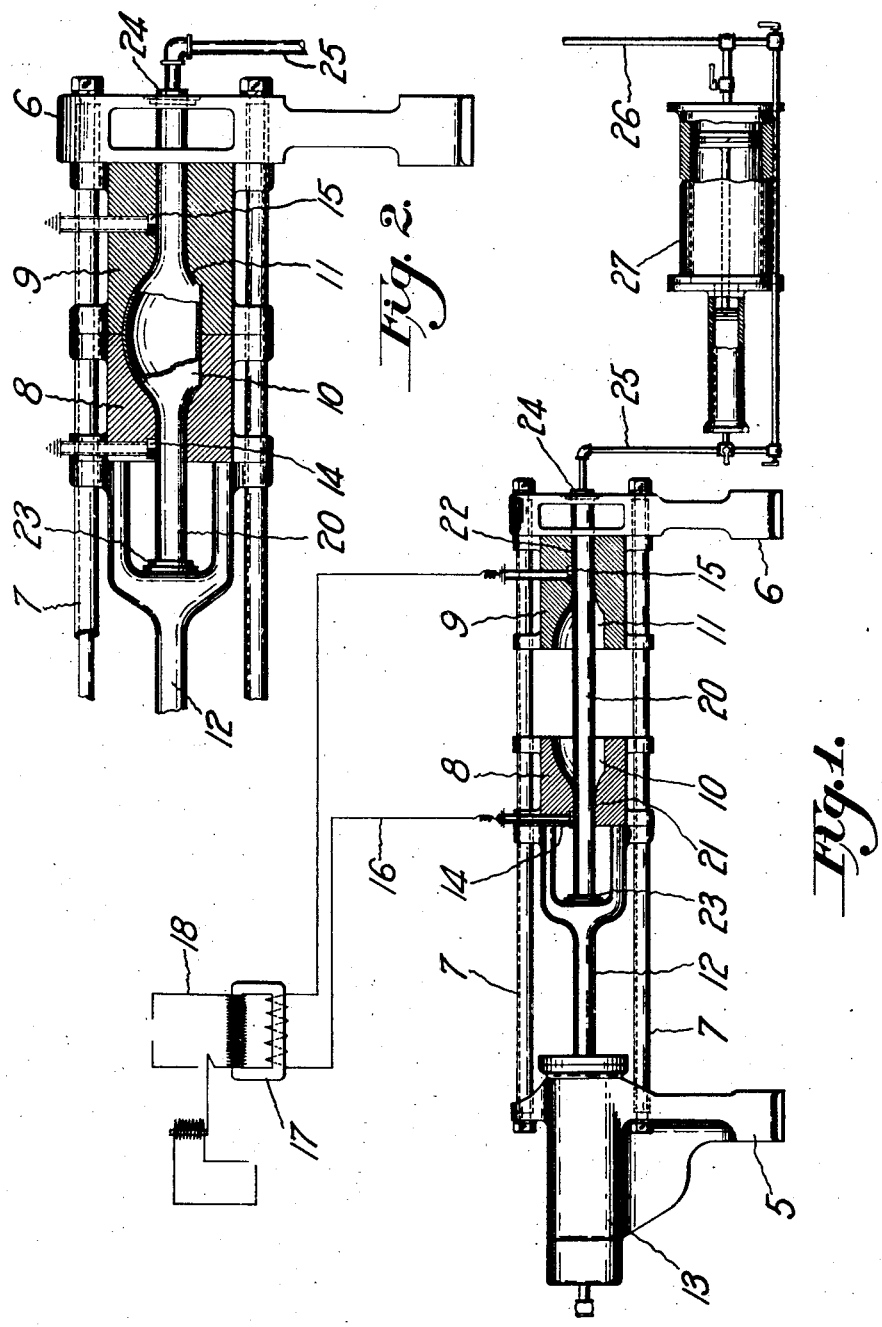

1,501,023

UNITED STATES PATENT OFFICE.

ELVIN S. GOODSPEED, OF DETROIT, MICHIGAN, ASSIGNOR TO GENERAL MOTORS CORPORATION, OF DETROIT, MICHIGAN, A CORPORATION OF DELAWARE.

PROCESS AND APPARATUS FOR FORMING METAL OBJECTS.

Application filed August 25, 1920. Serial No. 405,906.

*To all whom it may concern:*

Be it known that I, ELVIN S. GOODSPEED, a citizen of the United States, and a resident of Detroit, county of Wayne, and State of Michigan, have invented certain new and useful Improvements in Processes and Apparatus for Forming Metal Objects, of which the following is a full, clear, concise, and exact description, such as will enable others skilled in the art to which the invention relates to make and use the same, reference being made therein to the accompanying drawings, which form a part of this specification.

The invention relates to a process and apparatus especially adapted for forming metal objects and more particularly to such a process and apparatus in which an electric current is employed for the purpose of heating and softening the metal preliminary to or during the progress of the forming operation.

The object of the invention is to provide for the formation of an article by a combined upsetting and expanding operation while the blank is in a plastic condition.

A further object is to provide for the formation of a hollow article from a heated plastic blank by means of internal pressure, preferably under the influence of a fluid pressure medium.

A further object is to provide for the formation of a hollow article by the combined upsetting and expanding of an electrically heated blank within a pair of relatively movable mold members.

With the above and other objects in view as will appear more fully from the following description the invention consists of the features of novelty hereinafter described and set forth in the claims, it being understood that many variations in specific details may be made by one skilled in the art without departing from the spirit and scope of the invention.

In the accompanying drawings illustrating a form of apparatus adapted to carry out the process of the invention.

Figure 1 is an elevation of the apparatus with parts shown in section, and

Figure 2 is an enlarged detail view showing the mold members in the position which will be assumed when the forming operation has been completed.

In the drawings, 5 and 6 indicate frame members of any suitable character adapted to support the parts of the forming mechanism and connected by guides 7. The mold members 8, 9, will be supported upon the guides in such manner that one, at least, of the members may be moved along the guides so that when the two members are brought into proximity the mating recesses 10, 11, formed in the faces thereof will enclose a space corresponding to the shape of the article which it is desired to produce. As shown the member 9 may be permitted to rest against a portion of the frame 6 while the member 8 may be arranged to be moved longitudinally of the guides as by a ram 12 operated in any suitable manner as by a piston traveling in a fluid pressure cylinder 13.

Electrodes 14, 15, arranged to contact with the blank held in the members 8, 9, are connected to the secondary circuit of a transformer 17 in order to supply a heating current of large amperage to the said blank. The heating current may be arranged to be controlled in any appropriate manner, as by an electrically operated switch in the primary circuit 18 of the transformer.

Insulating means will be provided of course where necessary to confine the path of the current to that portion of the blank between the electrodes.

When the articles to be formed comprise an enlargement intermediate the ends of a blank, as when an irregular formation is to be produced in an intermediate portion of a tubular blank, the mold members 8, 9, will be formed with apertures, as at 21, 22, through which the ends of the blank will be permitted to extend. The blank is shown by way of example as a tube at the intermediate portion of which is to be formed an enlargement corresponding to that occurring in a conventional axle housing. The ends of the blank will be supported in such manner that endwise pressure may be exerted thereon, as against the frame 6 and the ram 12 respectively. When the blank is tubular the ends will be suitably sealed as at 23, 24, and a means for the supply of fluid pressure medium, as a pipe 25, may be arranged in any appropriate manner to supply a suitable pressure medium to the interior of the tube. The source of pressure medium will preferably be such that the pressure may be varied at will. As shown a pressure supply pipe 26 adapted to supply a fluid at low pressure is arranged to operate a differential piston mechanism 27 whereby pressure medium at higher pressure may be provided as desired.

In the practice of the process a suitable blank may be mounted in the apparatus as already described, the mold members being at such distance from each other as may be determined by the amount of metal required in the formation of the article. The electric current being turned on, the blank is brought to the desired degree of plasticity between the points where it contacts with the electrodes. Fluid pressure will be applied in the meantime sufficient to prevent the blank from buckling and preferably sufficient to cause it to become somewhat distended. The mold members and the ends of the blank may now be caused to approach each other thereby performing an upsetting operation which provides the additional metal necessary to maintain a uniform thickness in the walls of the enlarged portion as it expands to fill the recesses in the mold members. The pressure of the fluid medium may be increased as necessary to cause the expanded metal to assume the exact contour of the mold recess. While the apparatus as shown provides for the simultaneous movement of the mold members and upsetting of the blank it will be seen that the two operations need not be necessarily simultaneously nor coextensive. If the apertures in the mold members through which the blank extends are such as to permit a relative sliding movement of the said members and the blank the mold may be entirely closed before the upsetting movement begins, suitable mechanism being provided to render these movements independent or non-synchronous. Furthermore the two movements may be made simultaneous but with any desired variation in relative rates.

The current may be turned off after the metal has reached the desired degree of plasticity necessary to permit the completion of the shaping operation. The metal, as will be obvious, will be quickly cooled by contact with the walls of the mold or die and may be then removed from the apparatus.

While the process and apparatus have been herein described as relating in the preferred form to the production of hollow articles it will be understood that in some respects, omitting of course the use of internal pressure, it would be applicable also to the production of particularly shaped articles from or portions upon solid bars.

In the production of hollow articles it will be noted that the invention offers the particular advantage of rendering possible the formation of an enlargement or expanded structure without decreasing the thickness of the walls thereof, since the upsetting operation provides the additional metal necessary to maintain or even to increase the thickness of the expanded portion.

It will also be understood that the use of external means for supplying fluid pressure medium during the progress of the forming operation may not be necessary in all cases. It may be sufficient to place in the blank preliminarily a charge of pressure medium sufficient to produce the desired pressure, or merely to seal the ends of the blank thereby confining therein the air normally present in the interior, the necessary pressure being produced by the expansion of the air under the influence of the heat developed by the passage of the electric current.

I claim:

1. The process of forming articles which comprises supporting a hollow blank within a mold recess, heating the blank while thus supported to a temperature at which it becomes plastic, applying pressure to the interior of said blank to cause the same to expand within the mold recess, and simultaneously reducing the length of the blank to provide additional material for the walls of the blank within the mold recess.

2. The process of forming articles which comprises supporting a hollow blank within mold members said blank being heated to a temperature at which it becomes plastic, supplying to the interior of said blank a gaseous fluid pressure medium adapted to cause the expansion of the same to take the form of the mold, and shortening the blank to provide additional material for the walls of the blank within the mold.

3. The process of forming articles which comprises supporting a blank between mold members having recesses therein, applying an electric current to heat the blank, causing the die members to approach each other when the blank becomes plastic, and causing the blank to be upset to conform to the said recesses.

4. The process of forming articles which comprises supporting a hollow blank within mold members, heating the blank by the passage of an electric current therethrough, reducing the length of the blank, and causing it to expand by the influence of internal pressure.

5. The process of forming articles which comprises supporting a hollow blank between mold members, heating the blank by the passage of an electric current therethrough, causing the mold members to approach each other, shortening the blank, and causing it to expand by supplying fluid medium to the interior thereof under pressure.

6. In molding apparatus the combination of a plurality of mold members provided with recesses and apertures communicating therewith adapted to receive a tubular blank with its ends extending through said apertures, means carried by said mold members adapted to transmit electric current through the said blank, means for applying pressure longitudinally of said blank to cause the same to be upset within said recesses, and means for supplying a fluid pressure medium to the interior of said blank.

In testimony whereof I affix my signature.

ELVIN S. GOODSPEED.